No. 3,404. REISSUED APR. 27, 1869.

J. LEFFEL, DEC'D.

J. S. GOODE & J. W. BOOKWALTER, EXECUTORS.

GATE AND GUIDE OF WATER WHEELS.

2 SHEETS—SHEET 1.

Witnesses

Thos. L. Boyle

Chas. T. Clunn

Inventor

James S. Goode

John W. Bookwalter

Exs of Jas. Leffel dec'd by

D. A. Mallory & Co.

their Attys.

THE NORRIS PETERS CO., PHOTO-LITHO., WASHINGTON, D. C.

No. 3,404. REISSUED APR. 27, 1869.

J. LEFFEL, DEC'D.

J. S. GOODE & J. W. BOOKWALTER, EXECUTORS.

GATE AND GUIDE OF WATER WHEELS.

2 SHEETS—SHEET 2.

Thos. L. Bayles
Chas. F. Ellmann

Jas. S. Goode
John W. Bookwalter
Exors of James Leffel dec'd by
D. S. Bollinger
their atty

THE NORRIS PETERS CO., PHOTO-LITHO., WASHINGTON, D. C.

UNITED STATES PATENT OFFICE.

JAMES S. GOODE AND JOHN W. BOOKWALTER, OF SPRINGFIELD, OHIO, EXECUTORS OF THE ESTATE OF JAMES LEFFEL, DECEASED.

IMPROVEMENT IN GATES AND GUIDES OF WATER-WHEELS.

Specification forming part of Letters Patent No. 34,150, dated January 14, 1862; Reissue No. 1,792, dated October 11, 1864; Reissue No. 3,171, dated October 27, 1868; Reissue No. 3,404, dated April 27, 1869.

*To all whom it may concern:*

Be it known that JAMES LEFFEL, late of Springfield, in the county of Clarke and State of Ohio, now deceased, did invent new and useful Improvements in the Gates and Guides of Water-Wheels, and we, JAMES S. GOODE and JOHN W. BOOKWALTER, his executors, of the same place, do now declare that the following is a full, clear, and exact description of the same, reference being had to the annexed drawings, making part of this specification, in which—

Figure 1:
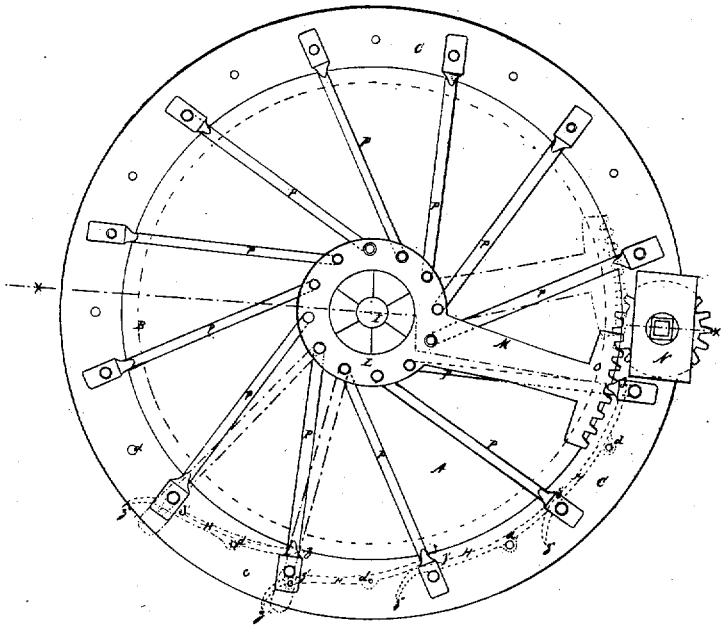
Figure 4:
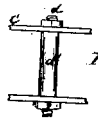
Figure 3:
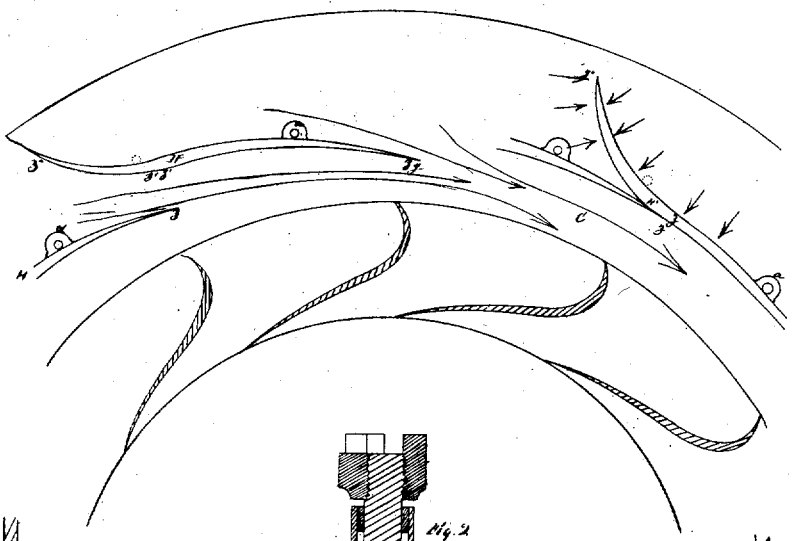
Figure 2:
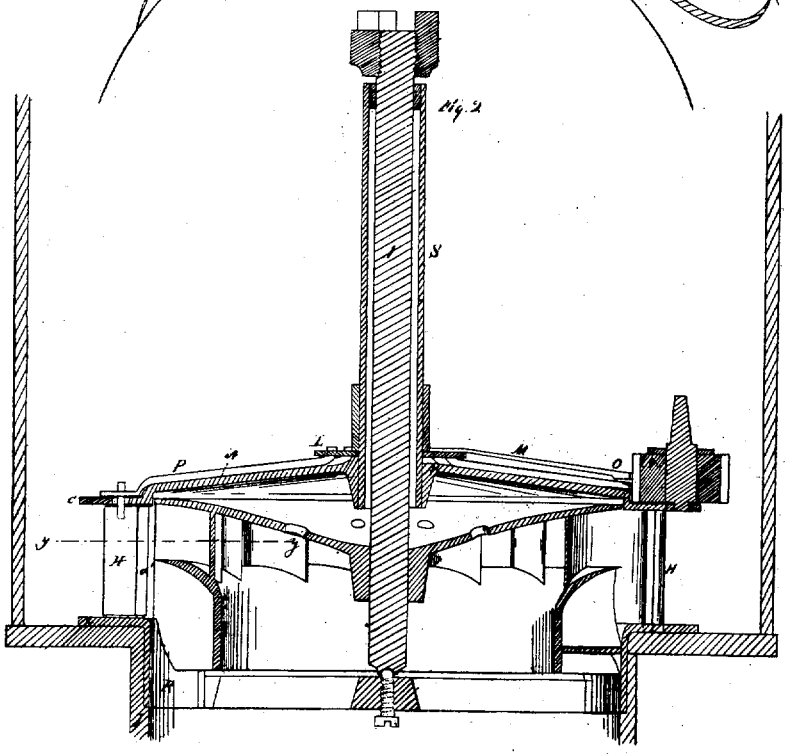

Figure 1 is a top or plan view. Fig. 2 is a vertical section on the line *x x*, Fig. 1. Fig. 3 is a horizontal section of a portion of the casing of the wheel on the line *y y* of Fig. 2, and Fig. 4 is an elevation showing part of the flanges and a connecting-bolt.

The same letters in all the figures are used to designate identical parts.

This invention relates to the form, arrangement, and mode of operating a series of plates, which perform the function of gates to regulate the quantity and of guides to control the direction of the water flowing upon that class of turbinne water-wheels in which the water is directed centrally upon the buckets of a wheel placed within said guide-plates, and after acting upon the wheel is discharged in a vertical direction through a tube connecting the wheel with the tail-water, so as to bring to bear upon the wheel not only the weight of the column of water above the wheel, but also the atmospheric pressure counterbalanced by the height of the column below the wheel.

This invention consists, first, in gate and guide plates of a particular form, to be hereinafter set forth, and so arranged around the wheel as to form, when the gates are open, converging throats, and so pivoted that when closed there shall be an equilibrium of pressure on the opposite ends thereof; secondly, in so constructing and arranging the gates that when closed their inner faces nearest the wheel shall be on a curve concentric with the wheel, the gates being pivoted to flanges above and below them at a point in the middle of the latter's faces; thirdly, in the combination of a series of gates of the peculiar form set forth with mechanism for simultaneously operating them; fourthly, in so constructing the plates which form the guides directing the flow of water upon the wheel, and so arranging them in relation to the wheel and to each other, that they shall form converging chutes, and deliver the water in a line tangential to the wheel into an annular vortex chamber formed between the inner faces and ends of the said plates and the wheel.

In the case illustrated in the drawings the gates are shown as applied to the casing and wheel of said Leffel's double turbine, patented originally January 14, A. D. 1862.

H H are the plates, which serve as gates for shutting off or regulating the flow of the water passing between them, and also as guides for directing it upon the periphery of the wheel. It will be observed that these functions are distinct. To perform the first, they must be made to oscillate upon pivots. The other is performed by them when they are stationary. These gates or guides are thin metallic plates, placed between the two parallel horizontal flanges *c* and *e*. The upper flange, *c*, extends outward from and is attached to the crown-plate A, which covers the wheel, and the flange *e* is attached to and surrounds the cylindrical tube R, which incloses the lower part of the wheel, and, being air-tight, contains the column of water below the wheel, discharging it below the surface of the tail-water. These parts are fully described in the specification of our reissued Letters Patent No. 3,170, dated October 27, 1868, to which reference is made for a more perfect understanding of the same.

The wheel being covered by the crown-plate, (which is neatly fitted about its shaft I, so as to exclude the water,) and being inclosed below by the cylinder R—the flange *e* of which rests upon the bottom of the flume or forebay—it follows that the water can only flow onto the wheel through the space between the parallel flanges *c* and *e*, in which space the vertical plates H are arranged in series around the wheel, so as to admit the water equally to all parts thereof at the same time. The form of these guiding-plates which is preferred is clearly shown in Fig. 3. They are attached and held in place by bolts passing through the flanges *c* and *e* and through lugs at *d* upon their upper and lower edges, or by short journals cast with the plates and passing into holes formed in said flanges, or by bolts passing through said flanges and through holes bored through the gate-plates, or in any other convenient manner, so as to oscillate freely on such pivots.

The gates in Fig. 3, on the left side, are represented as open, showing the form of the issues formed between said plates, and those on the right are represented as closed, showing the manner in which the plates shut one upon the other so as entirely to exclude the water from the wheel. The issue in the throat of the guide-plates is formed at *z z'*. The inner end of the plate is at *z*, the outer end being at *z''*. The point *z'* is on the inner face of the plate, (or face nearest the wheel,) at the point where the curve formed in the outer end of the plate begins to be reversed to form the curve of the inner end of the said plate. The curves of the plates between *z'* and *z* are determined by the circumference of a circle concentric with the wheel and having a radius greater than that of the wheel, so as to form between the guide-plates and the wheel what may be called a "vortex chamber," to be hereinafter more fully described.

When the gates are closed, their inner faces will form a perfect circle around the wheel, the point of one plate, *z*, folding against the next plate in the series at *z'*, so as to exclude the water, and when the gates are fully open there must be still a space between the points of the gates and the periphery of the wheel sufficient to permit the reunion of the column of water broken in passing between the guides, thus forming entirely around the wheel a vortex chamber, which must be of sufficient depth to permit the water entering between the guides to sweep around in an unbroken mass in the direction of the revolution of the wheel, thereby preserving the unbroken solidity of the column of water and equalizing the supply of water to all the issues of the wheel, and at the same time preventing that tremor which would be incident to the near approximation of the points of the gates to the wheel, which would cause the rapid wearing away of the surfaces at the pivots.

The consequence of this construction and arrangement of the guide-plates is that the water flowing between them will be delivered upon the wheel in a line precisely tangential to the outer circumference of the wheel, and not, as is the case in most other wheels, upon a line forming a secant of the wheel. By this means the water is delivered upon the wheel in a direction to produce the maximum of effect.

It should be understood that the direction of this line of impact is to be determined by the center line of the column of water passing between the guides and not by that part of the column passing along the plates. By observing Fig. 3 it will be apparent that with the form and arrangement of guide-plates here employed it would be impossible to give the proper tangential direction to the water without setting them far enough from the wheel to form the vortex chamber, and it will further be observed that the depth of this vortex chamber approximates nearly to the width of the issues of the guides.

Outside of the termination of the inner curve at *z'* the plate is curved in the opposite direction, so that, as seen in the drawings, the throat of the gate is formed by the approximation of two curved and converging plates, the issue being at the termination of one gate and the point *z'* of the other. The advantage of this peculiar form is that the curved lines forming the throat, conforming to the curve of what hydraulicians call the "vena contracta," the largest possible amount of water will be delivered through orifices of a given area, and in consequence the water will be delivered upon the wheel with a minimum of disturbance in an unbroken column, and consequently with a maximum of effect.

The outwardly-flaring curve of the plates H is important, because this form of plates will open the mouths of the passages toward the water flowing in from the flume or forebay, in the center of which the wheel is placed, so that the water will enter without tending to produce such a vacuum as would be caused by plates set across the line of the entering water.

The gates are pivoted at *d*, which point is determined by the middle of that part of the gate between *z* and *z'*, so that when the gate is closed the inward pressure of the water is the same or nearly the same upon the portion of the gate between *z* and *d* as that between *z'* and *d*. There being thus an equilibrium of pressure upon the two ends of the gates, it follows that they may be opened and closed by the application of power sufficient merely to overcome the friction of the parts and such additional resistance as may be caused by a slight additional pressure upon one side.

The mechanism for operating the gates simultaneously to open, close, or regulate their opening, as required, consists of a ring, collar, or hub, L, placed centrally over the middle of the crown-plate A, which covers the wheel, a series of connecting-rods, P, one for each gate, which extend outwardly from the hub to the gates, connecting the hub with the gates, and an arm or lever, M, attached to the hub L, and extending outwardly to near the edge of the crown-plate, and provided with a segment-rack, O, which engages with and is operated by a pinion, N, fast to a vertical shaft, which should be carried up above the head, as usual in pinion-shafts, for operating ring and rod mechanisms for gates of water-wheels.

It will be observed by inspection of the drawings that the arm or lever M is attached to the ring or hub L at a place above the points of divergence of the connecting-rods from the hub, so that the arm or lever can swing freely over the connecting-rods, and therefore be operated to work the gates without obstruction by the rods. By reason of this arrangement of the arm or lever to swing over the gate-rods, connected with the centrally-disposed collar or hub over the crown-plate, as many gates may be used as are desired, and it is considered desirable to have as many gates as the number of buckets in each series of the wheel.

It will also be observed that this arrangement enables the pinion-shaft to be stepped upon the top of the crown-plate when a large number of gates are used, because the pinion and segment may be set above the gate rods, and therefore will not obstruct them.

What is claimed as the invention of the said JAMES LEFFEL, and desired to be secured by Letters Patent, is—

1. Gates H, pivoted centrally as to the pressure of water when they are closed; but this is only claimed when the gates are constructed as described and so arranged around the wheel as to form converging throats, so that when closed there shall be an equilibrium of pressure on the opposite ends thereof, substantially as set forth.

2. Gates H, which have their faces from $z''$ to $z'$ outwardly flaring and their faces from $z'$ to $z$, when closed, on a curve concentric with the wheel, and pivoted to the flanges $c$ and $e$ at a point, $d$, in the middle of the latter faces, substantially as set forth.

3. The series of gates H, when constructed and pivoted substantially as set forth, connected and combined with the mechanism for simultaneously operating them, substantially as set forth.

4. The plates H, located and arranged in relation to each other and to the wheel substantially as described, thereby forming the converging chutes to direct the water in a line tangential to the wheel into an annular vortex chamber, substantially such as described, and substantially as set forth.

5. The plates H, substantially as herein described, and arranged around the wheel so as to form converging throats, in combination with the parallel flanges $c$ and $e$, respectively attached to the crown-plate A and cylinder R, the whole being so connected as to form a portable case for a water-wheel, substantially as set forth.

6. The arrangement of the rods, ring, lever, segmental rack and pinion for operating the gates; but this we claim only when so arranged that the pinion shall be stepped upon the upper or crown plate above the gates, substantially as and for the purpose set forth.

In testimony whereof we have signed our names to this specification before two subscribing witnesses.

JAMES S. GOODE.
JOHN W. BOOKWALTER.

Witnesses:
R. MASON,
A. RUPPERT.